Nov. 15, 1949  G. E. HOLLMANN ET AL  2,488,408
HYDRAULIC VARIABLE SPEED MOTION TRANSMISSION
Filed Nov. 29, 1946  4 Sheets-Sheet 1

George E. Hollmann
and
Louis Hollmann
INVENTORS
BY A. G. Burns
Attorney

Nov. 15, 1949     G. E. HOLLMANN ET AL     2,488,408
HYDRAULIC VARIABLE SPEED MOTION TRANSMISSION
Filed Nov. 29, 1946
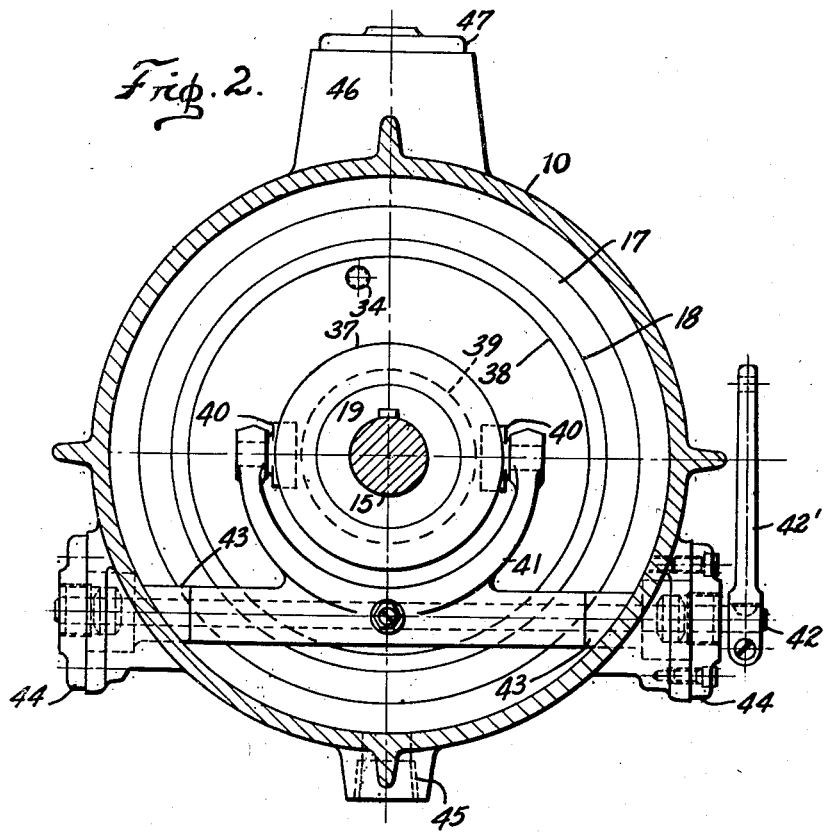

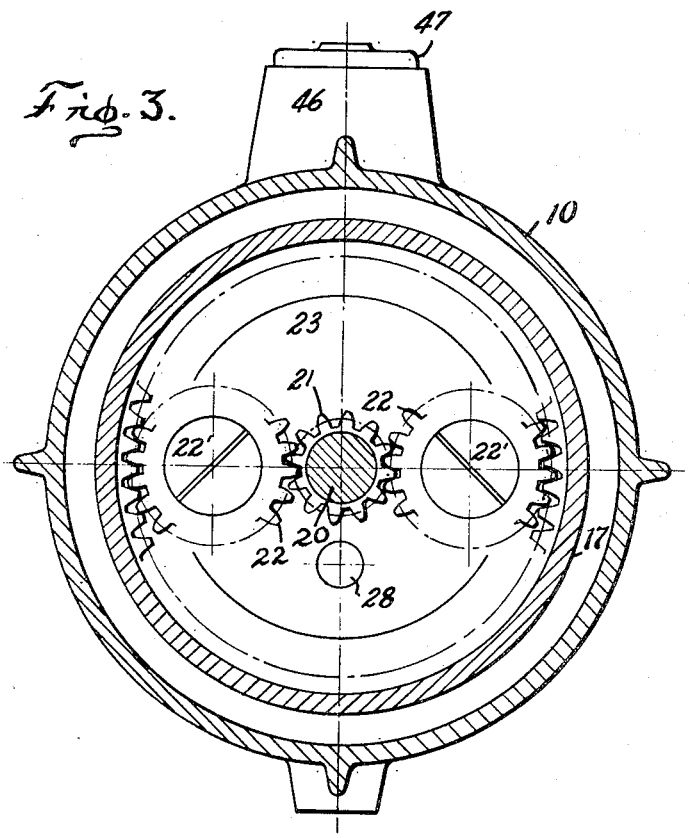

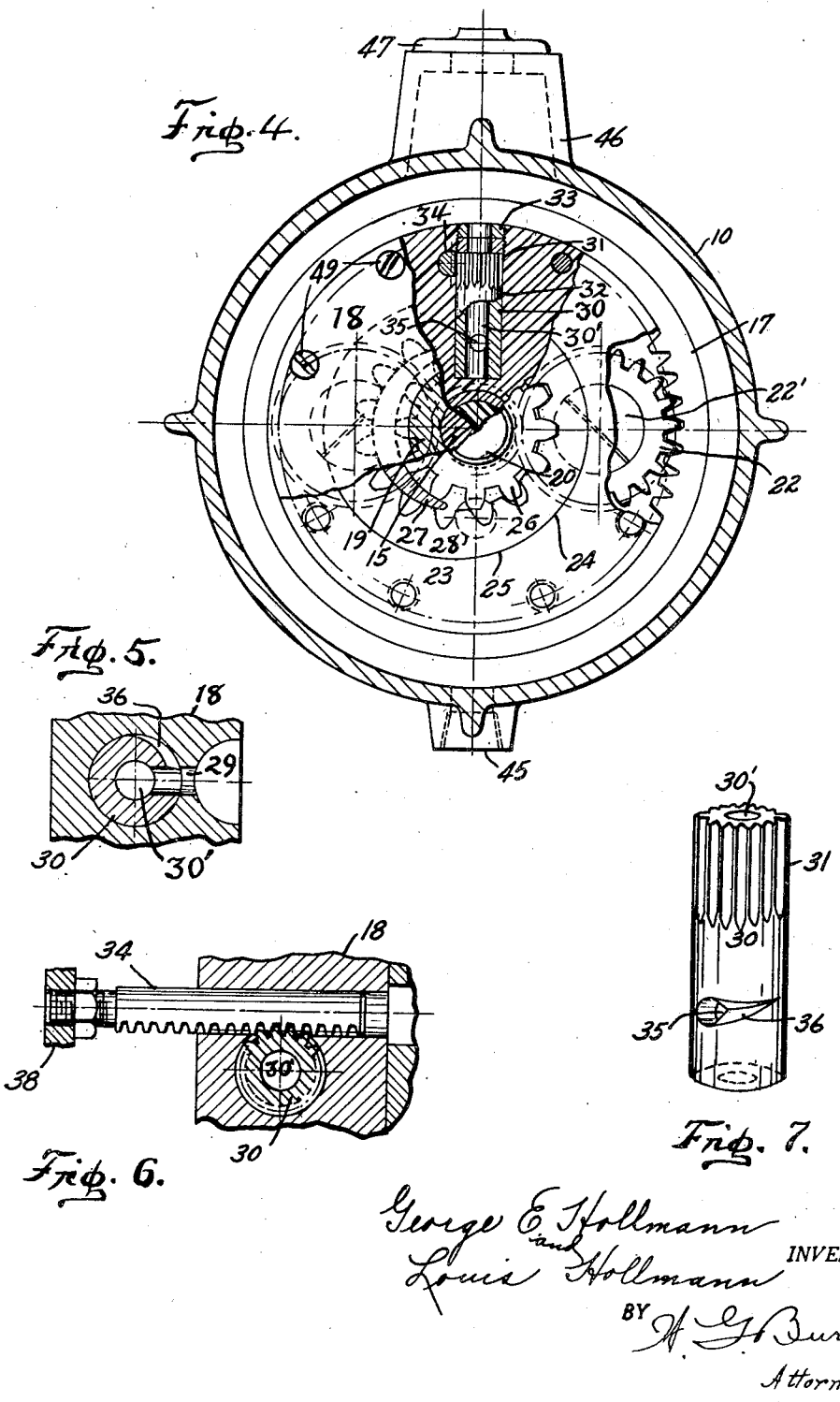

Patented Nov. 15, 1949

2,488,408

UNITED STATES PATENT OFFICE 2,488,408

HYDRAULIC VARIABLE-SPEED MOTION TRANSMISSION

George E. Hollmann, Ann Arbor, Mich., and Louis Hollmann, Fort Wayne, Ind.

Application November 29, 1946, Serial No. 712,954

10 Claims. (Cl. 74—794)

This invention relates to improvements in hydraulic variable speed motion transmissions.

Generally, variable speed transmissions, such as those used in automobiles have speed change gearing in which the gears are shifted out of articulation and moved into engagement with different sets of gears selectively to effect change in the speed ratio between the drive-shaft and the driven shaft, each shifting operation being accompanied by a break in the transmitting force. In such mechanism the various speeds are at definitely fixed ratios, and the changes of speed require a variety of manipulations by the operator which leads to more or less confusion.

An object of the instant invention is to transmit rotary force from a drive-shaft to a driven shaft at gradually varying speed ratios without shifting of gears or re-arrangement of any of the motion transmitting parts.

Another object of the invention is to afford a compact speed change power transmission wherein the articulating gears are maintained in their relative arrangement constantly while variations of the speed are affected.

And a further object of the invention is to provide a transmission constructed so that the speed change between a driveshaft and driven shaft is affected gradually from the minimum to the maximum ratios by manipulation of but one control lever.

Other objects and advantages of the invention appear in the following description.

An illustrative embodiment of the invention is shown in the accompanying drawings, in which:

Fig. 2 is an elevational view showing a transverse section of Fig. 1 on the line A—A thereof;

Fig. 3 is another elevational view showing a transverse section of Fig. 1 on the line B—B thereof;

Fig. 4 is another elevational view of the device shown in Fig. 1 in section on the lines C—C, D—D and E—E thereof, parts being broken away to disclose the relative arrangement of obscure parts;

Fig. 5 is a detail transverse section through the throttle valve and its situs;

Fig. 6 is another detail transverse section of the throttle valve, the rack-shaft by which it is driven and their situs; and Fig. 7 is a perspective view of the throttle valve.

Figs. 5, 6 and 7 are drawn to an increased scale.

Figure 1:
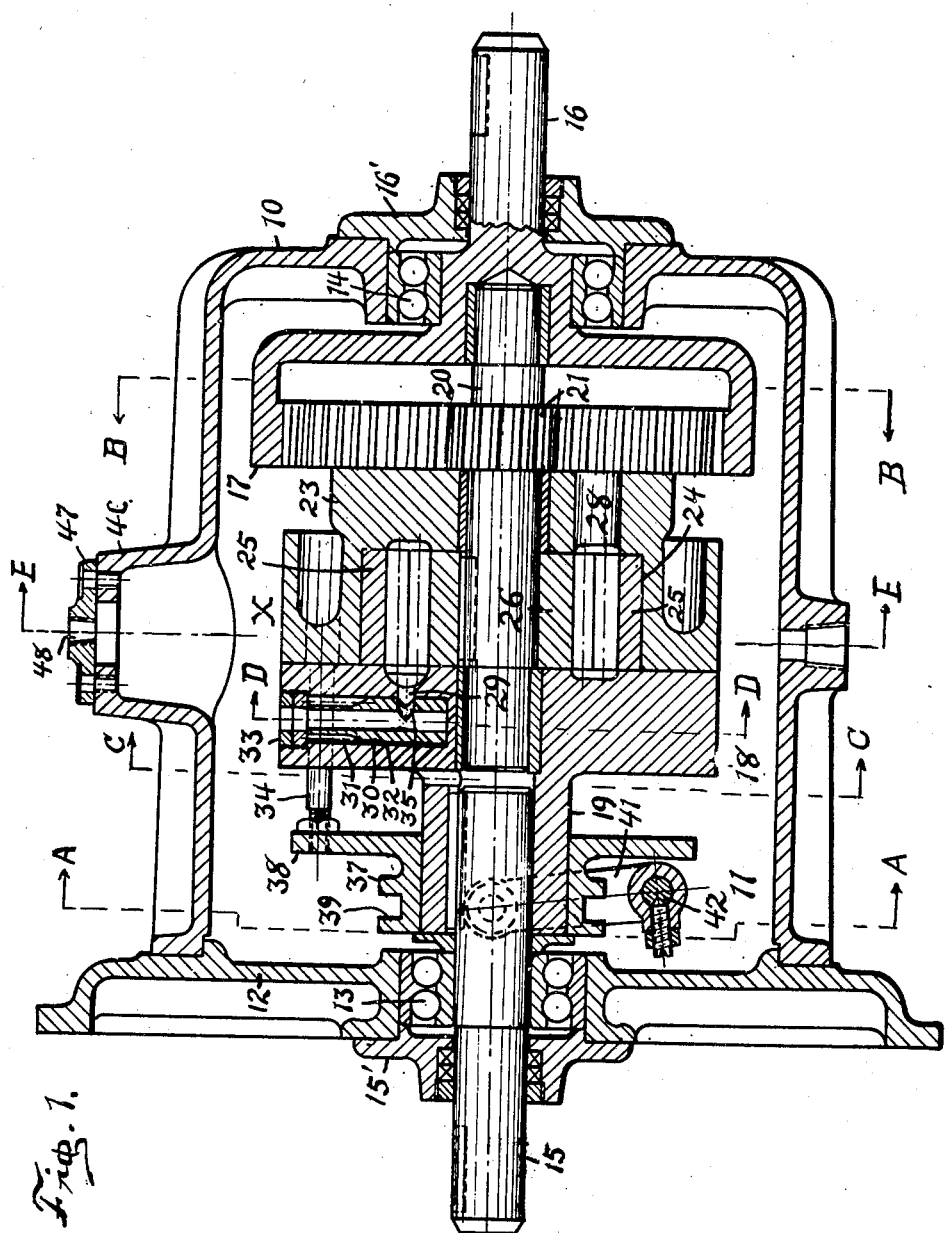
Fig. 1 is a side elevational view of a structure in which the invention is incorporated, shown in vertical central section.

The illustrative embodiment of the invention consists of a hollow case 10 providing an oil chamber 11 that is closed by a base 12. Mounted in the base and opposite end of the case are axially alined bearings 13—14 disposed concentrically with respect to the case. In the bearing 13 is mounted a drive-shaft 15 and in the bearings 14 is mounted a driven shaft 16. Packing rings 15'—16' are provided on the exterior of the base and opposite end of the case, that encompass the drive and driven shafts respectively, by which leakage of oil from the oil chamber is prevented.

In the rear bearing 14 is mounted an internally toothed gear 17 with which the driven shaft 16 is integral or otherwise secured thereto, and upon the inner end of the drive-shaft 15 is mounted concentrically a pump-head 18, the shaft extending into and keyed in the hub 19 thereof.

An intermediate shaft 20 is positioned in alinement with and between the drive-shaft and driven shaft, its ends being supported loosely for rotation in the internal gear 17 and the pump-head 18 respectively. The shaft 20 has thereon a drive pinion 21 that has toothed engagement with oppositely positioned planetary gears 22 that articulate with the internal gear 17.

The pump cylinder block 23, which is secured to the pump head 18 by means of the pin members 49 (see Fig. 4) has an eccentric bore 24 in which is loosely confined a floating internally toothed ring 25, and on the intermediate shaft is keyed an externally toothed pump gear 26 disposed within the bore of said block 23, the pitch diameter thereof being less than that of the floating gear 25 with which the pump gear articulates.

The rear face of the pump-head 18 has thereon a crescent shaped divider 27 that projects into the bore 24 of the cylinder block, the curved inner face thereof being concentric with the pump gear 26 and contacting the points of the teeth thereof, the curved outer face of said divider being concentric with the floating ring 25 and contacting the points of its teeth. Thus, the divider fills in the void in the bore of the cylinder block between the pump gear 26 and the floating ring 25. The rear end of the cylinder block has an intake opening 28 located adjacent one end of the divider and an outlet opening 29 located adjacent the opposite end thereof, the arrangement being such that when the pump gear and ring are in action the voids between the teeth thereof are filled with transient fluid that is conveyed therein from the intake opening to the outlet, as in well known types of rotary pumps. The outlet of fluid is controlled by a tubular throttle valve 30 one portion of which has an annular series of teeth 31, the valve being disposed in a radial bore 32 in the pump-head 18 and loosely confined therein by lock-rings 33. The throttle valve is actuated by a rack-bar 34 that has sliding movement in the pump-head and engagement with the teeth 31 on the valve, so that upon endwise movement of the rack-bar the throttle valve is rotated upon its axis.

A valve opening 35, in the plane of the outlet opening 29, extends radially through the wall of the valve into the bore 30' thereof and has a lateral tapered extension 36 in the exterior wall of the valve so that upon turning of the valve, more or less of the transient fluid entering the pump is permitted to escape therefrom out through the throttle valve back into the oil chamber.

The planetary gears 22 (Figs. 3 and 4) are rotatably supported upon corresponding studs 22' on the rear end of the cylinder block 23 so that the rotary pump body comprising the interconnected pump head 18 and the pump cylinder block 23 as, indicated generally by X, causes the planetary gears to roll selectively upon the teeth of the internal gear 17, or upon the teeth of the drive pinion 21, and the floating ring 25 is rotated accordingly by action of the pump-gear 26 causing the oil to circulate through the pump more or less freely accordingly as the throttle valve is open or closed.

Upon the hub 19 of the pump head (Fig. 2) is loosely mounted an axially movable sleeve 37 having a radial flange 38 that is connected with the rack-bar 34, and is provided with an external annular groove 39 in which pivoted shoes 40 on a yoke 41 extend so that as the yoke is rocked the sleeve is moved axially on the hub 19 causing rotation of the throttle valve through the medium of the rack-bar. The yoke is secured upon a rock-shaft 42 that extends laterally through the case. The ends of the rock-shaft 42 are loosely supported in corresponding bearings 43 in the case, sealing caps 44 being provided to prevent leakage of fluid from the oil chamber out through the bearings. One end of the rock-shaft projects outwardly through the corresponding bearing and is provided with a lever 42' by which to adjustably move the yoke.

Preferably, the case 10 has a drain plug 45 in its bottom and a dome 46 extending from its top, there being a cover 47 on the dome provided with a vent opening 48.

Operation

In utilizing the invention, the drive-shaft 15 is connected with a suitable source of power, the driven shaft is connected with mechanism to be actuated (not shown), and the oil chamber is filled with fluid, preferably crank case oil. Initially, the throttle lever is manipulated to place the throttle valve in full open position so that when the drive-shaft is rotated, the pump body is revolved, the fluid from the oil chamber is circulated through the pump without restraint, the planetary gears rotate upon their studs 22' while idling with respect to the internal gear 17 and the drive pinion 21. While thus operating, the internal gear 17 and driven shaft remain at rest, the pump idly revolves, and transmission of power from the drive-shaft to the driven shaft is substantially nil. However, when the throttle valve is closed or partially closed, passage of the fluid through the pump is restrained more or less, whereupon torque of the revolving pump body X is with varying force imparted to the internal gear through the medium of the planetary gears. Thus, the speed ratio, with respect to the pump and internal gear, is varied accordingly as the flow through the pump is restrained.

By the transmission thus constructed and operated, rotary movement of the drive-shaft is imparted with varying force to the driven shaft through the medium of the revolving pump and the planetary gear mechanism, with gradually varying speed ratio, under control of throttling mechanism for stopping or variably retarding the pump from functioning as it is bodily revolved.

Variations from the particular construction above disclosed may be resorted to by the exercise of skill in the art, without departure from the spirit or scope of the invention.

What we claim is:

1. A variable speed transmission comprising a casing having a supply of fluid therein, a drive shaft journaled through one wall of the casing and a driven shaft journaled through the opposite wall of the casing in axial alignment with the drive shaft, a rotary pump body within the casing mounted on the inner end of the drive shaft for rotation therewith, an intermediate shaft extending between the respective inner ends of the drive and driven shafts in axial alignment therewith, and journaled at one end within the rotary pump body and at the other end within the driven shaft and interconnected with the said pump body, a planetary gearing interposed between the intermediate shaft and the driven shaft and including components mounted on said rotary pump body, a fluid inlet in the pump body and a valve controlled fluid outlet in the pump body, means to actuate said valve including means disposed exteriorly of the casing, whereby as the valve is actuated from open to closed position the drive shaft rotates the pump body and planetary gear mechainsm and thus the driven shaft at varying speed ratios dependent upon the amount of fluid flow through the pump.

2. A compact variable speed transmission comprising a casing having a supply of fluid therein, a drive shaft journaled through one wall of the casing and terminating within the casing, a driven shaft journaled through the opposite wall of the casing in axial alignment with the drive shaft and likewise terminating within the casing, a fluid pump body within the casing mounted on the drive shaft for rotation therewith, an intermediate shaft within the casing in axial alignment with the drive and driven shafts and supported at one end within the pump body and at the other end within the inner end of the driven shaft, gearing connecting the intermediate shaft and the pump body with the driven shaft, said pump body having a fluid inlet and a fluid outlet, a valve for controlling the fluid outlet, said valve being bodily disposed within the pump body, and means to actuate said valve, whereby as the fluid flow through the pump is controlled, the drive shaft rotates the pump body and the gearing interposed between the pump and the driven shaft and thus the driven shaft at varying speed ratios depending on the quantity of fluid flowing through the pump.

3. A compact variable speed transmission comprising a stationary casing, axially aligned drive and driven shafts journaled in opposite walls of the casing and terminating therewithin, a rotary pump body mounted on the inner end of the drive shaft for rotation therewith, an intermediate shaft within the casing in axial alignment with the drive and driven shafts and journaled at its opposite ends, respectively, in the pump body and the inner end of the driven shaft and interconnected with the said pump body, an internally toothed ring gear secured to the inner end of the driven shaft for transmitting rotation thereto, a sun gear mounted on the intermediate shaft intermediate the ends thereof and exteriorly of the pump body, planet pinions mounted on stub shafts projecting from the end face of the pump body, said planet pinions meshing with the sun gear and said internally toothed ring gear, said body pump having an inlet and an outlet for the circulation of fluid therethrough, and a valve controlling the said outlet, said valve being disposed within the pump body, and means for actuating the said valve including means positioned exteriorly of the casing whereby, as the valve is actuated from an open to a closed position, the drive shaft imparts rotation to the pump body, the gearing mounted thereon, the intermediate shaft and the internally toothed gear and thus the driven shaft, at varying speed ratios, the rate of speed varying as the flow of fluid through the valve is varied in accordance with the degree of opening thereof.

4. A variable speed transmission comprising a stationary casing having a supply of fluid therein, a drive shaft journaled through one wall of the casing and terminating therewithin, a driven shaft journaled through the opposite wall of the casing terminating therewithin in axial alignment with the drive shaft, a rotary pump body mounted on the inner end of the drive shaft for rotation therewith, an intermediate shaft within the casing disposed between and in axial alignment with the inner ends of the drive and driven shafts, and journaled at one end within the pump body and at its other end within the inner end of the driven shaft, said intermediate shaft having spaced gears thereon, one gear being within the pump body and serving as a pump gear and the other being on the intermediate shaft exteriorly of the pump body, an internally toothed ring gear on the inner end of the driven shaft, and gears mounted for rotation on the end face of the pump body adjacent the ring gear, said last named gears being in mesh, respectively, with the gear on the intermediate shaft exteriorly of the pump and the internally toothed ring gear secured to the driven shaft, the said gearing constituting a planetary mechanism for imparting rotation to the driven shaft at varying speed ratios, an inlet for the pump and a valve controlled outlet therefor, and means to actuate said valve to regulate the flow of fluid through the pump and thereby the speed of rotation of the driven shaft, said valve actuating means including a lever disposed exteriorly of the casing.

5. A variable speed transmission comprising a casing having a supply of fluid therein, drive and driven shafts journaled through opposite walls of the casing in axial alignment with each other and terminating in spaced relation within the casing, a rotary gear pump having a laterally extended hub mounted on the drive shaft for rotation therewith, an intermediate shaft disposed between and in axial alignment with the inner ends of the drive and driven shafts, one end of the intermediate shaft being supported by the pump and the opposite end being supported by the inner end of the driven shaft, said intermediate shaft having a pump gear thereon and a drive pinion thereon in spaced relation to the pump gear and disposed exteriorly of the pump, gearing connecting said drive pinion with the driven shaft, said pump having an inlet and an outlet, said pump further having a radially extending elongated tubular bore therein constituting a portion of the outlet, an elongated apertured tubular valve disposed within said bore, adapted for rotation therein to position the aperture in the valve so as to control fluid flow therethrough, means to rotate said valve including a sleeve slidably mounted on the hub of the pump, a yoke member in engagement with the sleeve and pivotally mounted within the casing, and means disposed exteriorly of the casing to pivotally move said yoke member and thereby slide the said sleeve to rotate the valve, whereby fluid flow through the pump is controlled and thus the rotation imparted to the gearing and the driven shaft is varied in accordance with the degree of fluid flow through the pump.

6. A compact variable speed transmission comprising a casing, a drive shaft journaled through one end thereof, an axially aligned driven shaft journaled through the opposite end thereof, a pump head keyed to the inner end of the drive shaft for rotation therewith, an intermediate shaft extending between said pump head and said driven shaft and freely rotatable relative thereto, a pump cylinder surrounding said intermediate shaft and secured to said pump head, an inlet for the pump cylinder and an outlet therefor extending through the pump head, a valve to control said outlet, gear means within said cylinder to effect passage of fluid through said pump, said means including a gear keyed to said intermediate shaft, and a planetary transmission comprising a sun gear on the intermediate shaft, an internally toothed ring gear rotating with the driven shaft and planetary pinions interposed between the sun gear and the ring gear and supported on shafts extending from the end face of the pump cylinder, and means to control said valve including means positioned exteriorly of the casing whereby when the valve is closed, the pumping mechanism and the planetary transmission rotate as a unit to drive the driven shaft and when the valve is open relative rotation exists between the pump and the planetary transmission to drive the driven shaft at a reduced rate depending upon the degree of opening of the valve.

7. A variable speed transmission comprising a casing having a supply of fluid therein, a drive shaft journaled through one wall of the casing and axially aligned with a driven shaft journaled through the opposite wall thereof, an intermediate shaft disposed within the casing in axial alignment with the drive and driven shafts and freely rotatable relative thereto, a gear pump surrounding said intermediate shaft and including a pump head keyed for rotation with the drive shaft, said pump having a working cylinder surrounding the intermediate shaft, pump gears surrounding said intermediate shaft and disposed within the working cylinder, one of said gears being keyed to said intermediate shaft and the other gear floating within the working cylinder about said first mentioned gear, an inlet for passage of fluid into said pump cylinder, a valve controlled outlet for regulating the discharge of fluid from said pump cylinder, a planetary transmission connecting the intermediate shaft with the driven shaft and thereby the driving shaft with the driven shaft and valve actuating means including means positioned exteriorly of the casing for controlling the passage of fluid through the pump whereby when the valve is closed, the relative elements of the pump are locked for rotation as a unit and a direct drive is effected from the drive shaft through the pump mechanism and the planetary transmission to the driven shaft and as the valve is opened relative rotation exists between the pump and the planetary transmission to vary the speed of the driven shaft.

8. A variable speed transmission as defined in and by claim 7, wherein the working cylinder of the pump is an enlarged bore formed within the pump eccentric with respect to the axis of the drive, driven and intermediate shafts.

9. A variable speed transmission comprising a stationary casing having a supply of fluid therein, a drive shaft journaled through one wall of the casing and an axially aligned driven shaft journaled through the opposite wall of the casing, a pump head keyed to the inner end of the drive shaft and rotating therewith, an intermediate shaft freely journaled at one end in the pump head and in its opposite end in the driven shaft, a pump cylinder surrounding said intermediate shaft and connected to said pump head, an enlarged bore constituting a working chamber formed in the end face of the cylinder block adjacent the end face of the pump head, a pump gear keyed to said intermediate shaft and disposed within said working chamber, a crescent shaped chamber divider extending from the end face of the pump head into the working chamber, an internally toothed floating ring disposed within the working chamber about the divider and the pump gear, an inlet opening communicating with said working chamber adjacent one end of the divider, the pump head having a radial bore extending from the outer surface thereof interiorly thereof, and a lateral passage therein communicating between the radial bore and the working chamber and constituting an outlet therefor, an apertured tubular valve disposed within said radial bore for controlling the flow of fluid through the working chamber, a planetary gearing transmission disposed between said intermediate shaft and said driven shaft, the planet pinions thereof rotating on shafts projecting from the end face of the cylinder block, means to actuate said valve including means positioned exteriorly of the casing, so as the valve is actuated between open and closed position, the passage of fluid therethrough from the working chamber is controlled, thereby varying the speed ratio of the driven shaft with respect to the drive shaft.

10. A variable speed power transmission comprising a housing having a supply of fluid therein, a drive shaft rotatably journaled through a bore in one end of the housing, a driven shaft rotatably journaled through a bore in the opposite end of the housing and in axial alignment with the drive shaft, a pump head circular in cross section and having a laterally extending hub keyed to the inner end of said drive shaft, an internally toothed ring gear within the casing and connected to the inner end of the driven shaft, an intermediate shaft freely journaled at one end in a bore in the driven shaft and at its other end in the pump head, said intermediate shaft being in axial alignment with the drive and driven shafts, a pump cylinder block complementary in shape to said pump head and mounted about said intermediate shaft, a bore in the face of said cylinder block adjacent the outer face of the pump head and said bore constituting a pump chamber, a crescent shaped projection extending from the outer face of the pump head and projecting within the pump chamber, the outer arcuate face of said crescent shaped projection being in spaced relation to the inner wall of said pump chamber, a pump gear keyed to said intermediate shaft and disposed within the pump chamber, a floating idler ring positioned within the pump chamber and having internal teeth thereon in contact with the outer surface of the crescent shaped projection and of a size to mesh with the exterior teeth on said pump gear, a laterally extending inlet opening passing through said pump cylinder block and communicating with the bore therein, an elongated radially extending bore in said pump head extending from the outer surface inwardly thereof, a lateral passage through said pump head and connecting the said bore with the pump chamber, a rotatable tubular valve disposed within the radially extending bore in the pump head, said valve having an aperture therethrough adapted to register with the aperture through the pump head that is in communication with the pump chamber, a valve actuating means to rotate said tubular valve so as to control the passage of fluid through the pump, a sun gear mounted on the intermediate shaft exteriorly of the outer face of the pump cylinder block, spaced stub shafts projecting from the outer face of said cylinder block and planetary pinions mounted on said stub shafts, said planetary pinions being respectively in mesh with the sun gear and the said internally toothed ring gear secured to the driven shaft, said valve actuating means including means positioned exteriorly of the casing for controlling the operation of the transmission so that when the valve is actuated and the aperture therein is out of register with the passage through the pump head and power is applied to the drive shaft, the pump head and cylinder block, the intermediate shaft and the planetary gearing rotate as a unit to drive the driven shaft and as the valve is actuated to allow fluid to pass therethrough relative rotation of the pump gear keyed to the intermediate shaft and the floating ring is permitted which effects rotation of the internally toothed ring gear relative to the cylinder block through the rotation of the sun gear and the planetary pinions thereby transmitting power to the driven shaft at a reduced speed ratio depending upon the amount of fluid flowing through the valve.

GEORGE E. HOLLMANN.
LOUIS HOLLMANN.

REFERENCES CITED

The following references are of record in the file of this patent:

UNITED STATES PATENTS

| Number | Name | Date |
| --- | --- | --- |
| 2,069,023 | Szekely | Jan. 26, 1937 |
| 2,118,464 | Fitzhugh | May 24, 1938 |
| 2,133,276 | Ballentyne | Oct. 18, 1938 |
| 2,149,320 | Szekely | Mar. 7, 1939 |
| 2,154,460 | Lawrence | Apr. 18, 1939 |
| 2,324,308 | Malmquist | July 13, 1943 |
| 2,339,015 | Jandasek | Jan. 11, 1944 |
| 2,416,311 | Hanson | Feb. 25, 1947 |